United States Patent
Chae et al.

(10) Patent No.: US 12,491,937 B2
(45) Date of Patent: Dec. 9, 2025

(54) METHOD AND DEVICE OF DETERMINING TRAVELING SAFETY RISK FACTOR BY DETERMINING OUTLIER OF STEERING WHEEL ACTUATOR

(71) Applicant: HL MANDO CORPORATION, Pyeongtaek (KR)

(72) Inventors: Hansang Chae, Pyeongtaek (KR); Sunggun Lee, Pyeongtaek (KR); Jaewoo Lee, Pyeongtaek (KR)

(73) Assignee: HL MANDO CORPORATION, Pyeongtaek (KR)

( * ) Notice: Subject to any disclaimer, the term of this patent is extended or adjusted under 35 U.S.C. 154(b) by 54 days.

(21) Appl. No.: 18/655,229

(22) Filed: May 4, 2024

(65) Prior Publication Data

US 2025/0222979 A1 Jul. 10, 2025

(30) Foreign Application Priority Data

Jan. 10, 2024 (KR) .................. 10-2024-0003926

(51) Int. Cl.
 *B62D 6/00* (2006.01)
(52) U.S. Cl.
 CPC .................................. *B62D 6/008* (2013.01)
(58) Field of Classification Search
 CPC .......... B62D 6/00; B62D 6/008; B62D 5/008; B62D 5/0448; B62D 5/0427; B62D 5/046; B62D 5/0469; B62D 5/001; B62D 15/0225; B66F 9/07572; B66F 9/07568; B66F 9/0755

USPC ...................................... 701/41–44
See application file for complete search history.

(56) References Cited

U.S. PATENT DOCUMENTS

| | | | | |
|---|---|---|---|---|
| 6,505,703 B2 * | 1/2003 | Stout | ...................... | B62D 6/008 |
| | | | | 701/41 |
| 6,535,806 B2 * | 3/2003 | Millsap | .................. | B62D 6/008 |
| | | | | 180/443 |
| 7,571,033 B2 * | 8/2009 | Fujioka | .................... | B62D 6/04 |
| | | | | 701/72 |
| 7,575,092 B2 * | 8/2009 | Endo | ...................... | B62D 5/049 |
| | | | | 180/405 |
| 9,499,193 B2 * | 11/2016 | Kageyama | ............. | B62D 5/046 |
| 2004/0138797 A1 * | 7/2004 | Yao | ...................... | B62D 5/0463 |
| | | | | 180/443 |
| 2011/0224874 A1 * | 9/2011 | Pattok | .................. | B62D 15/021 |
| | | | | 701/41 |
| 2013/0245890 A1 * | 9/2013 | Kageyama | ............... | B62D 7/18 |
| | | | | 701/41 |

(Continued)

*Primary Examiner* — Hai H Huynh
*Assistant Examiner* — Johnny H Hoang
(74) *Attorney, Agent, or Firm* — Harvest IP Law, LLP

(57) ABSTRACT

In a method that is performed by a steering device control device and determines a traveling safety risk factor by determining an outlier of a steering wheel actuator, the method includes controlling to transmit a steering angle of a driver from the steering wheel actuator to a road wheel actuator, controlling to transmit a feedback torque from the road wheel actuator to the driver based on a rack force, checking a system efficiency outlier during control of a steering device, and transmitting information about a system outlier to a traveling vehicle, in which the checking of the system efficiency outlier during the control of the steering device further includes detecting overall friction and detecting peak friction among the system efficiency outliers.

14 Claims, 7 Drawing Sheets

(56) References Cited

U.S. PATENT DOCUMENTS

2022/0266901 A1\* 8/2022 Kim ................. B62D 6/008
2023/0100164 A1\* 3/2023 Sun ................. B62D 5/0484
                                                701/41
2024/0101187 A1\* 3/2024 Im ..................... B62D 3/12

\* cited by examiner

METHOD AND DEVICE OF DETERMINING TRAVELING SAFETY RISK FACTOR BY DETERMINING OUTLIER OF STEERING WHEEL ACTUATOR

TECHNICAL FIELD

The present disclosure relates to a method and device for determining a traveling safety risk factor by determining an outlier of a steering wheel actuator, and more specifically, the present disclosure relates to a method and device capable of more effectively determining traveling stability of a traveling vehicle by determining overall friction and peak friction in parallel.

BACKGROUND

Unlike general-purpose steering devices, a Steer By Wire (SbW) includes a Steering wheel Feedback Actuator (SFA) and a Road Wheel Actuator (RWA). The SFA transmits a steering angle of a driver to the RWA, and the SFA transmits a feedback torque to the driver based on a rack force of the RWA. At this time, when efficiency of the system is reduced due to an abnormality and friction of the system becoming too high, a handle becomes heavy, and when the friction is too low, clearance may occur, resulting in noise and vibration.

Also, when part of a reducer is damaged, an average friction is not a problem, but it may cause a jamming sensation at a certain handle angle, and when it is damaged, a serious problem such as locking the handle may occur.

Therefore, as a more convenient and faster way to solve this problem, there is a need to discuss a method to determine an efficiency outlier that may occur in a steering device.

The above-mentioned background technology is technical information that the inventor possessed to derive the present disclosure or is acquired in the process of deriving the present disclosure, and cannot necessarily be said to be technology known to the general public prior to the filing of the present disclosure.

SUMMARY

The present disclosure is to provide a method of calculating friction that may occur in a system depending on temperature of a vehicle and checking whether a current friction of the system is within a range when the temperature of the vehicle is very low or high and the friction temporarily changes due to expansion and contraction of internal parts of a system and changes in grease viscosity.

In addition, the present disclosure is to provide a method of determining that a friction fault in the system is detected when the friction is outside the range and continues to be detected for more than a certain period of time.

According to an aspect of the present disclosure, there is provided a method that is performed by a steering device control device and determines a traveling safety risk factor by determining an outlier of a steering wheel actuator, the method including: controlling to transmit a steering angle of a driver from the steering wheel actuator to a road wheel actuator; controlling to transmit a feedback torque from the road wheel actuator to the driver based on a rack force; checking a system efficiency outlier during control of a steering device; and transmitting information about a system outlier to a traveling vehicle, in which the checking of the system efficiency outlier during the control of the steering device further includes detecting overall friction and detecting peak friction among the system efficiency outliers.

In one embodiment, the detecting of the overall friction among the system efficiency outliers may further include checking the maximum and minimum friction values according to temperature.

In one embodiment, the detecting of the overall friction among the system efficiency outliers may further include determining whether a disturbance torque is within a range, a torsion bar torque is equal to or less than a certain level, and a traveling vehicle speed is equal to or less than a certain level.

In one embodiment, the detecting of the overall friction among the system efficiency outliers may further include counting the number of determination contents when the disturbance torque is within the range, the torsion bar torque is equal to or less than the certain level, and the traveling vehicle speed is equal to or less than the certain level.

In one embodiment, the detecting of the overall friction among the system efficiency outliers may further include determining whether the number of the determination contents detected is equal to or more than a certain count.

In one embodiment, the detecting of the overall friction among the system efficiency outliers may further include determining the steering wheel actuator friction outlier as normal when the number of the determination contents is not equal to or more than the certain count.

In one embodiment, the detecting of the overall friction among the system efficiency outliers may further include an instruction for determining the steering wheel actuator friction outlier as normal when the number of times of the determination contents is equal to or more than the certain count.

In one embodiment, the detecting of the peak friction may further include calculating average friction through an FIR filter.

In one embodiment, the detecting of the peak friction may further include determining whether a disturbance torque is higher by a certain level than an average, a torsion bar torque is equal to or less than a certain level, and a traveling vehicle speed is equal to or less than a certain level.

In one embodiment, the detecting of the peak friction may further include storing a location at which the friction occurs when the disturbance torque is higher by the certain level than the average, the torsion bar torque is equal to or less than the certain level, and the traveling vehicle speed is equal to or less than the certain level.

The detecting of the peak friction may further include storing a location at which the friction occurs.

In one embodiment, the detecting of the peak friction may further include an instruction for determining whether the location at which the friction occurs appears repeatedly at the same location.

In one embodiment, the detecting of the peak friction further includes determining the outlier of the steering wheel actuator friction as normal when the location at which the friction occurs does not appear repeatedly at the same location.

The detecting of the peak friction may further include determining the outlier of the friction as normal.

In one embodiment, the detecting of the peak friction may further include determining the outlier of the steering wheel actuator friction as normal when the location at which the friction occurs appears repeatedly at the same location.

According to the present disclosure, when the temperature of the vehicle is very low or high and the friction temporarily changes due to expansion and contraction of internal parts of a system and changes in grease viscosity, it is possible to calculate friction that may occur in the system depending on the temperature and check whether a current friction of the system is within this range.

In addition, according to the present disclosure, it is possible to determine that a friction fault in the system is detected when the friction is outside the range and continues to be detected for more than a certain period of time.

DETAILED DESCRIPTION

Figure 1:
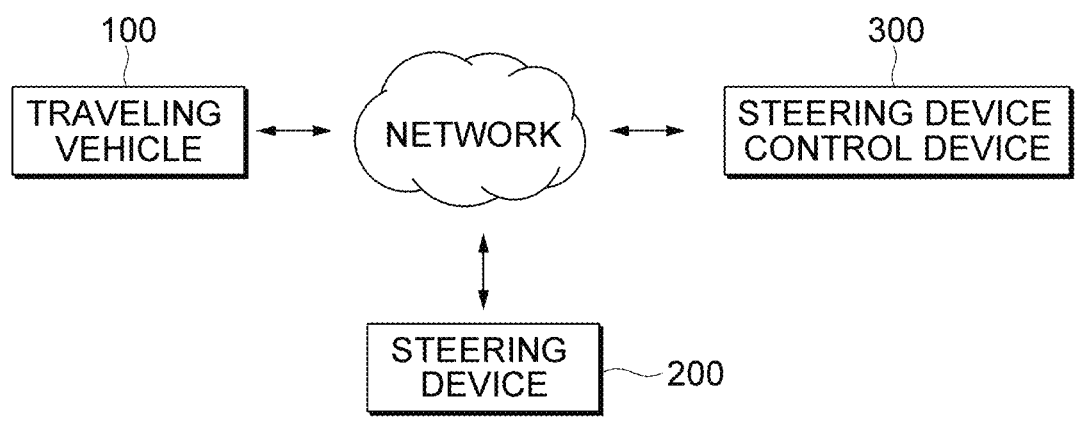
FIG. 1 illustrates an example environment in which a steering device control device according to some embodiments of the present disclosure may be applied.

Hereinafter, preferred embodiments of the present disclosure will be described in detail with reference to the attached drawings. The advantages and features of the present disclosure and methods for achieving them will become clear by referring to the embodiments described in detail below along with the accompanying drawings. However, the technical idea of the present disclosure is not limited to the following embodiments and may be implemented in various different forms, the following examples are provided solely to complete the technical idea of the present disclosure and to completely inform those skilled in the art of the present disclosure of the scope of the disclosure, and a technical idea of the present disclosure is only defined by the scope of the claims.

When adding reference numerals to components in each drawing, it should be noted that the same components are indicated by the same reference numerals as much as possible even when they are illustrated in different drawings. Additionally, in describing the present disclosure, when it is determined that a detailed description of a related known configuration or function may obscure the gist of the present disclosure, detailed descriptions thereof will be omitted.

Unless otherwise defined, all terms (including technical and scientific terms) used in the present specification may be used with meanings that can be commonly understood by those skilled in the art to which the present disclosure pertains. Additionally, terms defined in commonly used dictionaries are not interpreted ideally or excessively unless clearly specifically defined. The terminology used herein is for the purpose of describing embodiments and is not intended to limit the disclosure. In the present specification, singular forms also include plural forms unless specifically stated in the phrase.

Additionally, in describing the components of the present disclosure, terms such as first, second, A, B, (a), and (b) may be used. These terms are only used to distinguish the component from other components, and the nature, sequence, or order of the component is not limited by the term. When a component is described as being "connected," "coupled," or "joined" to another component, that component may be directly connected or joined to the other component, but it should be understood that another component may be "connected," "coupled," or "joined" between each component.

As used herein, expressions "comprises" and/or "comprising" mean that referenced components, steps, operations and/or elements do not exclude the presence or addition of one or more other components, steps, operations and/or elements.

Hereinafter, various embodiments of the present disclosure will be described in detail with reference to the attached drawings.

Additionally, when describing the components of the present disclosure, terms such as first, second, A, B, (a), and (b) can be used. These terms are only used to distinguish the component from other components, and the nature, sequence, or order of the component is not limited by the term. Throughout the specification, when a part is said to "include" or "have" a certain component, this means that it does not exclude other components but may further include other components, unless specifically stated to the contrary. Additionally, terms such as "unit" and "module" used in the specification refer to a unit that processes at least one function or operation, and may be implemented as hardware, software, or a combination of hardware and software.

FIG. 1 illustrates an example environment in which a steering device control device according to some embodiments of the present disclosure may be applied. An operation is performed to detect buckling of the attached parts of a road wheel actuator through a system including a traveling vehicle 100, a steering device 200, and a steering device control device 300 illustrated in FIG. 1, and through this, traveling stability of the traveling vehicle 100 can be determined.

Hereinafter, the operations of the components illustrated in FIG. 1 related to determining the traveling stability of the traveling vehicle 100 through the above-described system will be described in more detail.

FIG. 1 illustrates an example where the traveling vehicle 100, the steering device 200, and the steering device control device 300 are connected through a network, but this is only for convenience of understanding, and the number of devices that can be connected to the network can vary.

Meanwhile, FIG. 1 only illustrates a preferred embodiment for achieving the purpose of the present disclosure, and some components may be added or deleted as needed. Hereinafter, the components illustrated in FIG. 1 will be described in more detail.

The steering device control device 300 can collect and analyze various information generated from the traveling vehicle 100. The various information may include all data generated from the traveling vehicle 100, for example, a speed of the traveling vehicle, a wheel angle of a steering device, the specifications of the traveling vehicle itself, or the like, and further, may include information about an environment in which the traveling vehicle is traveling. This information may be information collected using a series of devices within the traveling vehicle 100 while the traveling vehicle 100 is traveling, and from the perspective of a person skilled in the art, it is obvious that the series of devices may include all electronic devices included in the traveling vehicle 100. Additionally, this information may include information collected when the vehicle is stopped rather than traveling.

The traveling vehicle 100 illustrated in FIG. 1 may include not only a vehicle equipped with autonomous driving technology, but also a vehicle that is not equipped with general autonomous driving technology. The traveling vehicle 100 may include both a four-wheeled vehicle and a two-wheeled motorcycle.

In order to avoid redundant description, various operations performed by the steering device control device 300 will be described in more detail later with reference to the drawings of FIG. 3 and below.

Meanwhile, the steering device control device 300 may be implemented as one or more computing devices. For example, all functions of the steering device control device 300 may be implemented in a single computing device. As another example, a first function of the steering device control device 300 may be implemented in a first computing device, and a second function may be implemented in a second computing device. Here, the computing device may be a notebook, a desktop, a laptop, or the like, but is not limited thereto and may include all types of devices equipped with a computing function. However, it may be desirable for the steering device control device 300 to be implemented as a high-performance server-class computing device. An example of the computing device will be described with reference to FIG. 7.

Additionally, functions that can be implemented by the steering device control device 300 may also be implemented using electronic devices mounted on the traveling vehicle 100. Therefore, in FIG. 1, the steering device control device 300 and the traveling vehicle 100 are illustrated separately, but according to one embodiment, it is natural that the steering device control device 300 is mounted on the traveling vehicle 100 so that the corresponding device can implement the first function, the second function, or the like within the traveling vehicle 100. Therefore, it should be noted that the interpretation is not limited to an embodiment in which the traveling vehicle 100 and the steering device control device 300 are externally separated as illustrated in FIG. 1.

In the present specification, for convenience of explanation, a situation in which the traveling vehicle 100 and the steering device control device 300 implement functions separately will be described.

In some embodiments, components included in the environment to which the steering device control device 300 is applied may communicate over a network. The network can be implemented as all types of wired/wireless networks such as Local Area Network (LAN), Wide Area Network (WAN), mobile radio communication network, Wibro (Wireless Broadband Internet), or the like.

Meanwhile, the environment illustrated in FIG. 1 illustrates that the traveling vehicle 100 and the steering device control device 300 are connected through a network, but the scope of the present disclosure is not limited thereto, and it should be noted that the traveling vehicle 100 may be connected to the steering device control device 300 via a Peer to Peer (P2P).

So far, with reference to FIG. 1, an exemplary environment in which the corresponding device 200 according to some embodiments of the present disclosure can be applied has been described. Hereinafter, with reference to the drawings of FIG. 3 and below, methods according to various embodiments of the present disclosure will be described in detail.

Each step of the methods to be described later may be performed by a computing device. In other words, each step of the methods may be implemented with one or more instructions executed by the processor of the computing device. All steps included in these methods may be performed by a single physical computing device, however, the first steps of the method may be performed by a first computing device and the second steps of the method may be performed by a second computing device.

Hereinafter, in FIG. 3, the description will be continued assuming that each step of the methods is performed by the steering device control device 300 illustrated in FIG. 1. However, for convenience of explanation, the description of the operator of each step included in the methods may be omitted.

In addition, in FIG. 2 below, the steering device 200 mounted on the traveling vehicle is schematically illustrated to continue the description. The components of the device for correcting the steering of the traveling vehicle 100 are explained through a simplified schematic drawing, but it should be noted that the present disclosure is not intended to primarily describe the technical composition or component composition of the steering device 200 itself.

Figure 2:
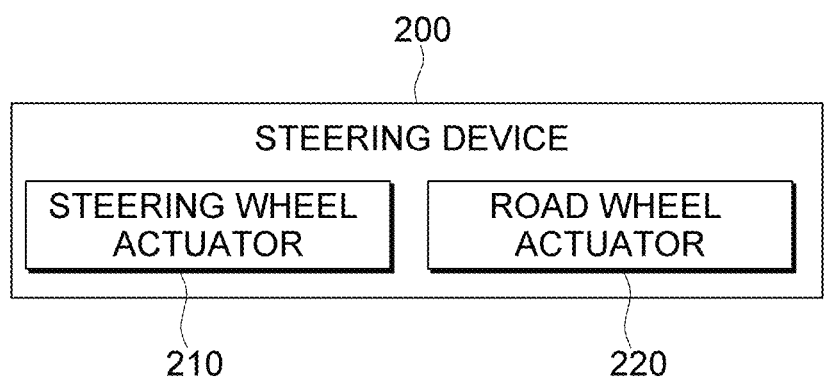
FIG. 2 is an example block diagram for explaining the steering device according to some embodiments of the present disclosure.

FIG. 2 is an example block diagram for explaining a steering device according to some embodiments of the present disclosure.

The traveling vehicle 100 may include the steering device 200. It goes without saying that the steering device 200 may include all mechanical devices for steering the traveling direction of the traveling vehicle 100 and all parts that transmit and receive electrical signals.

The steering device 200 may transmit and receive electrical signals with the steering device control device 300.

The steering device 200 may steer the direction of the traveling vehicle 100 according to steering of a driver while the traveling vehicle 100 is traveling, and may steer the driving direction of the traveling vehicle 100 according to a certain algorithm without the intervention of the driver of the traveling vehicle 100 in an autonomous traveling situation without the steering of the driver.

The steering device 200 may be an SBW system or a steering device including the system. Here, the SBW system is Steer-by-Wire, which can refer to an electric signal-type intelligent steering system that transmits and controls the steering intention of the driver through electrical signals without a mechanical connection between the steering wheel of the driver and the vehicle wheels.

According to one example, a steering wheel actuator 210 included in the steering device 200 is a Steering Feedback Actuator, which is an actuator that provides a reaction force to the steering wheel of the driver.

In addition, a road wheel actuator 220 included in the steering device 200 is a road wheel actuator that transmits the steering intention of the driver to the vehicle wheels and moves the wheels.

The steering wheel actuator 210 and the road wheel actuator 220 are not mechanically connected and driven, but are driven by transmitting and receiving electrical signals to each other. Additionally, the steering wheel actuator 210 and the road wheel actuator 220 may each move according to different inputs.

Since the directions of the steering wheel actuator 210 and the road wheel actuator 220 should be matched to each other when the traveling vehicle 100 is traveling at high speed, either the steering wheel actuator 210 or the road wheel actuator 220 becomes the main steering system of the traveling vehicle 100, and the non-main system is controlled with a value matching the output of the main system. More specifically, when one of the steering wheel actuator 210 and the road wheel actuator 220 system is the main system, the main system can subordinately control the non-main system.

When the traveling vehicle 100 is not autonomously driven but is controlled by the steering of the driver, the road wheel actuator 220 may move to reflect the steering intention of the driver.

Hereinafter, the process of determining an outlier that may occur in the steering wheel actuator 210 and determining whether the outlier is normal will be described in detail with reference to FIG. 3.

Figure 3:
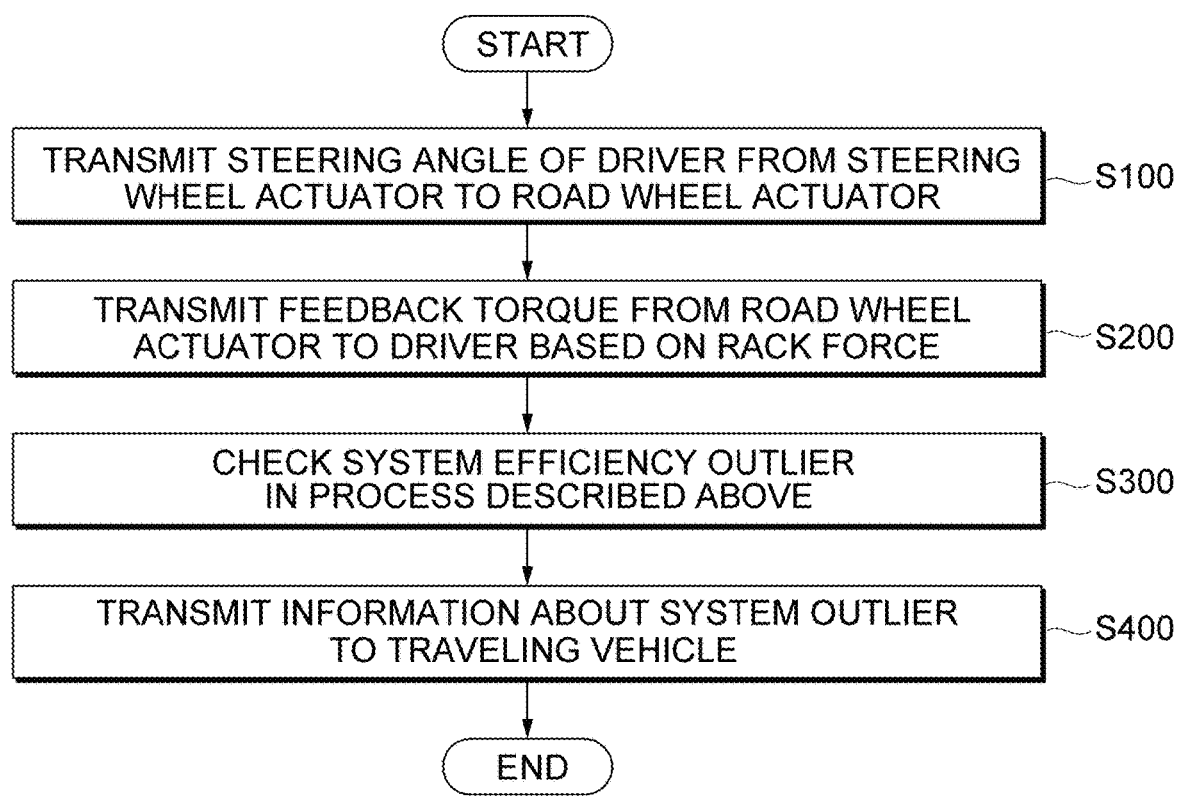
FIG. 3 is a flowchart of an operation for determining a system outlier that can be performed in the steering device control device according to some embodiments of the present disclosure.

FIG. 3 is a flowchart of an operation for determining a system outlier that can be performed in the steering device control device according to some embodiments of the present disclosure.

In Step S100, the steering device control device 300 may control to transmit the steering angle of the driver from the steering wheel actuator 210 to the road wheel actuator 220. In Step S200, the steering device control device 300 may control to transmit a feedback force from the road wheel actuator 220 to the driver based on the rack force. In Step S300, the steering device control device 300 can check a system efficiency outlier that may occur during steps S100 and S200. In this case, the specific system efficiency outlier checking process will be described in detail with reference to FIG. 4.

Figure 4:
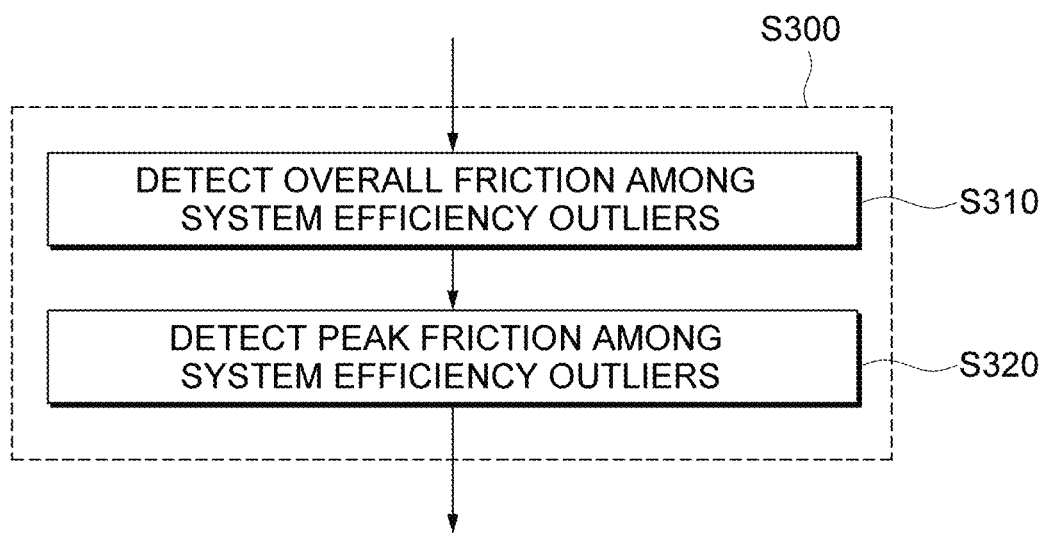
FIG. 4 is a flowchart specifically explaining steps of checking an efficiency outlier of a system according to some embodiments of the present disclosure.

FIG. 4 is a flowchart specifically explaining the steps of checking the system efficiency outlier according to some embodiments of the present disclosure.

In Step S310, the steering device control device 300 may detect overall friction among system efficiency outliers. In Step S320, the steering device control device 300 may detect peak friction among system efficiency outliers.

The steering device 200 must maintain a certain level of friction, but when the temperature of the traveling vehicle 100 is very low or high, friction temporarily changes due to expansion and contraction of internal parts of the system and changes in grease viscosity. Therefore, it is necessary to calculate the friction that may occur in the system depending on the temperature and check whether the current friction of the system is within this range. When the friction is outside this range and continues to be detected for more than a certain period of time, it is determined that a friction fault in the system has been detected.

In addition, when some parts are damaged, the average friction is not a fault, but a large friction is detected momentarily only in a certain section, so it is determined by checking whether this occurs repeatedly at the same location. In the present disclosure, the overall friction determines whether friction or efficiency outliers in the system as a whole are normal, and peak friction determines whether some efficiency outliers occur momentarily in a certain section.

This process will be described in detail through FIGS. 5 and 6.

Figure 5:
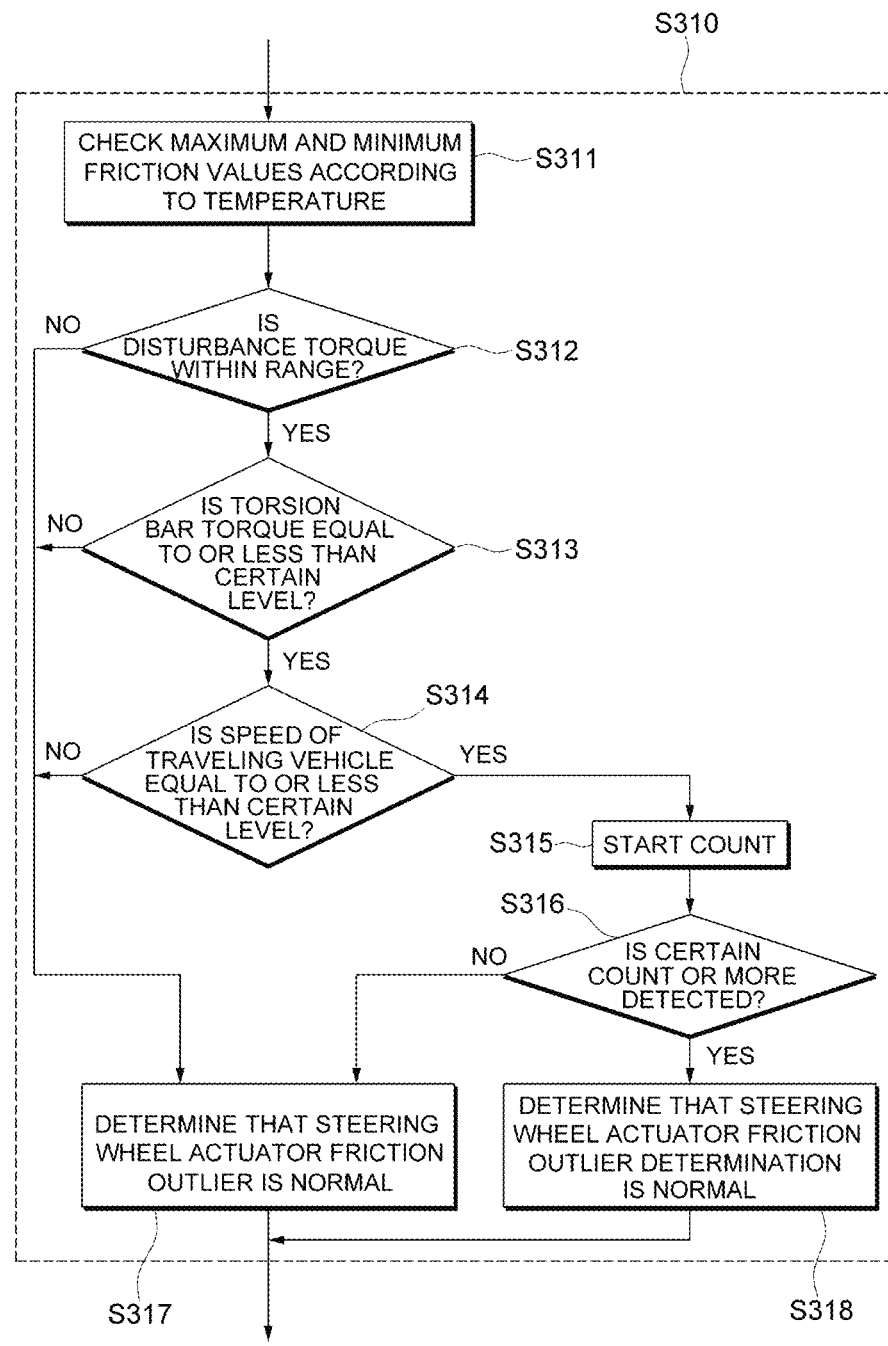
FIG. 5 is a flowchart specifically explaining steps for detecting overall friction according to some embodiments of the present disclosure.

FIG. 5 is a flowchart specifically explaining the steps for detecting the overall friction according to some embodiments of the present disclosure.

In Step S311, the steering device control device 300 can check the maximum and minimum friction values according to temperature. The above process can be checked by analyzing data generated from the traveling vehicle 100 or the steering device 200 in the steering device control device 300.

In Step S312, the steering device control device 300 may determine whether the disturbance torque is within a range. In Step S313, the steering device control device 300 can determine whether the torsion bar torque is equal to or less than a certain level. In Step S314, the steering device control device 300 may determine whether the speed of the traveling vehicle 100 is equal to or less than a certain level. Steps S312 to S314 may be processed in parallel in real time.

In Step S315, the steering device control device 300 may count the number of times of determinations when the disturbance torque is within the range, the torsion bar torque is equal to or less than the certain level, and the traveling vehicle speed is equal to or less than the certain level. Additionally, the steering device control device 300 may determine that the steering wheel actuator friction outlier is normal when any one of Steps S312 to S314 is not satisfied. In other words, the steering wheel actuator friction can be determined to be normal, and the friction can be determined to have occurred in the normal range.

Additionally, it should be noted that the constant level refers to a value within a pre-specified value or range by the user, and that the value may be changed dynamically.

In Step S316, the steering device control device 300 may determine whether the number of determination contents in Step S315 is detected to be equal to more than a certain number of times. In Step S317, the steering device control device 300 may determine that the steering wheel actuator friction outlier is normal when the number of determination contents detected is not detected to be equal to or more than a certain count. In Step S318, the steering device control device 300 may determine that the steering wheel actuator friction outlier is normal when the number of determination contents detected is detected to be equal to or more than a certain count. Therefore, in this case, the steering device control device 300 may check that the steering wheel actuator friction outlier determination is normal and that the steering wheel actuator friction occurrence is an outlier.

Figure 6:
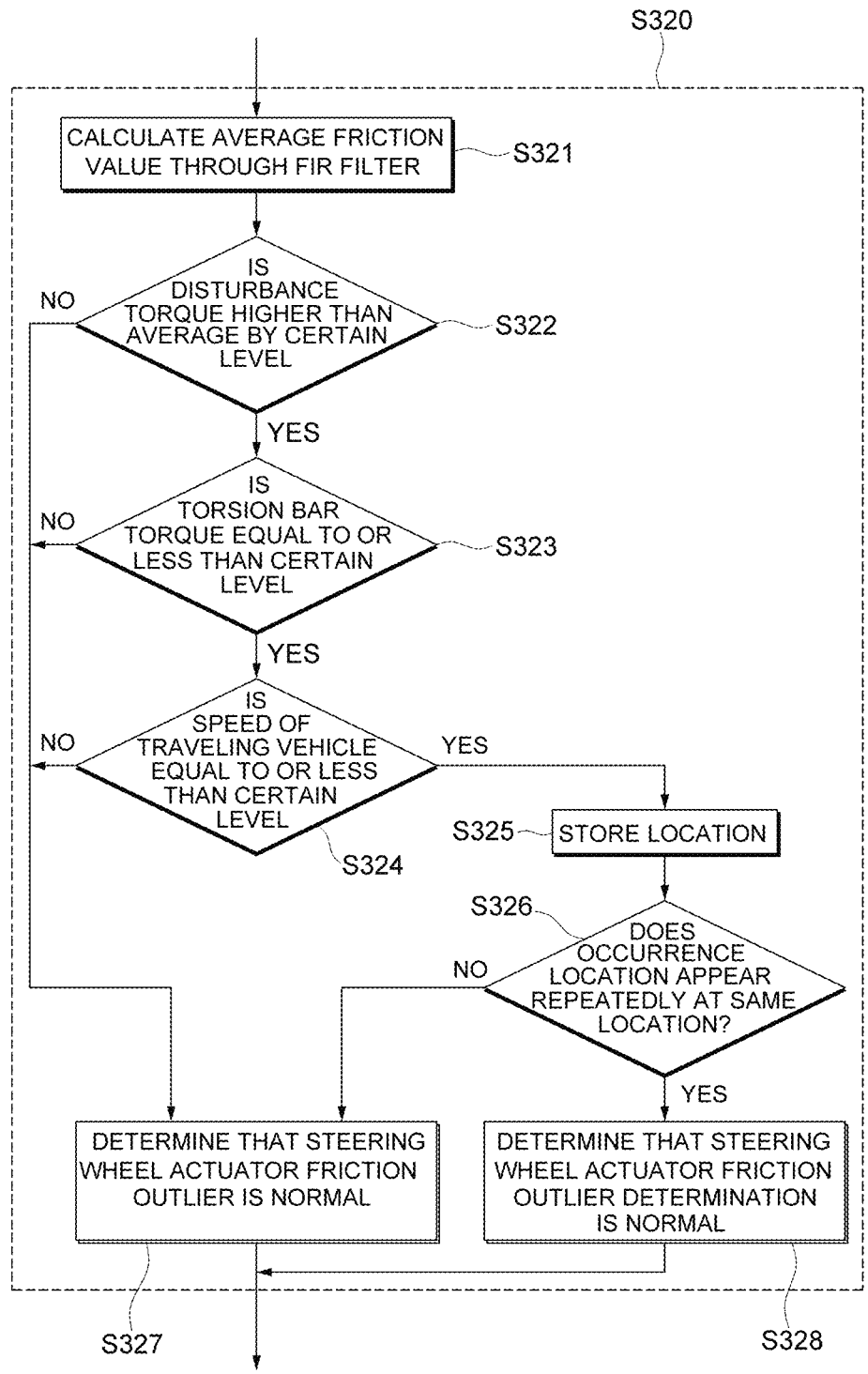
FIG. 6 is a flowchart specifically explaining steps for detecting peak friction according to some embodiments of the present disclosure.

FIG. 6 is a flowchart specifically explaining the steps for detecting the peak friction according to some embodiments of the present disclosure.

In Step S321, the steering device control device 300 may calculate an average friction value through a FIR filter. The above process can be checked by analyzing data generated from the traveling vehicle 100 or the steering device 200 in the steering device control device 300.

In Step S322, the steering device control device 300 may determine whether the disturbance torque is higher than the average by a certain level. In Step S323, the steering device control device 300 can determine whether the torsion bar torque is equal to or less than a certain level. In Step S324, the steering device control device 300 may determine whether the speed of the traveling vehicle 100 is equal to or less than a certain level. Steps S322 to S324 may be processed in parallel in real time.

In Step S325, the steering device control device 300 may store the location where the friction occurs when the disturbance torque is higher than the average by the certain level, the torsion bar torque is equal to or less than the certain level, and the traveling vehicle speed is equal to or less than the certain level. Additionally, the steering device control device 300 may determine that the steering wheel actuator friction outlier is normal when any one of Steps S322 to S324 is not satisfied. In other words, the steering wheel actuator friction can be determined to be normal, and the friction can be determined to have occurred in the normal range.

Additionally, it should be noted that the constant level refers to a value within a pre-specified value or range by the user, and the value may be changed dynamically.

In Step S326, the steering device control device 300 may determine whether the occurrence location in Step S315 appears repeatedly at the same location. In Step S327, the steering device control device 300 may determine that the steering wheel actuator friction outlier is normal when the occurrence location does not appear repeatedly at the same location. In Step S328, the steering device control device 300 may determine that the steering wheel actuator friction outlier is normal when the occurrence location appears repeatedly at the same location. Therefore, in this case, the steering device control device 300 can check that the steering wheel actuator friction outlier determination is normal, and that the steering wheel actuator friction occurrence is an outlier.

Returning to FIG. 3, in Step S400, the steering device control device 300 may transmit information about a system outlier to the traveling vehicle 100. Through the information about the outlier, in the traveling vehicle 100, it is possible to check both the driver and the passenger controlling the traveling vehicle 100.

Hereinafter, an exemplary computing device in which a steering device control device can be implemented will be described in detail using FIG. 7.

Figure 7:
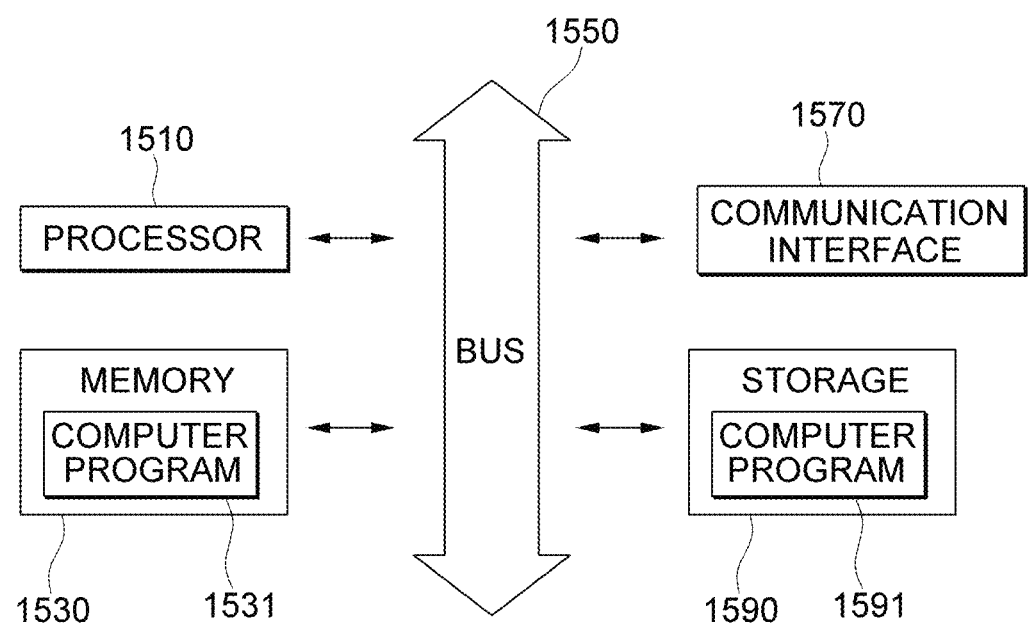
FIG. 7 is a diagram of an example computing device that may implement a device and/or a system according to various embodiments of the present disclosure.

FIG. 7 is a diagram of an example computing device that may implement devices and/or systems according to various embodiments of the present disclosure.

A computing device 1500 may include one or more processors 1510, a bus 1550, a communication interface 1570, a memory 1530 that loads a computer program 1591 performed by the processor 1510, and a storage 1590 for storing a computer program 1591. However, only components related to the embodiment of the present disclosure are illustrated in FIG. 7. Accordingly, a person skilled in the art to which the present disclosure pertains can recognize that other general-purpose components may be included in addition to the components illustrated in FIG. 7.

The processor 1510 controls the overall operation of each component of the computing device 1500. The processor 1510 may include a Central Processing Unit (CPU), a Micro Processor Unit (MPU), a Micro Controller Unit (MCU), a Graphic Processing Unit (GPU), or any type of processor well known in the art of the present disclosure. Additionally, the processor 1510 may perform operations on at least one application or program to execute a method according to embodiments of the present disclosure. The computing device 1500 may include one or more processors.

The memory 1530 stores various data, commands, and/or information. The memory 1530 may load one or more programs 1591 from the storage 1590 to execute a method according to embodiments of the present disclosure. The memory 1530 may be implemented as a volatile memory such as RAM, but the technical scope of the present disclosure is not limited thereto.

The bus 1550 provides communication functionality between components of the computing device 1500. The bus 1550 may be implemented as various types of buses, such as an address bus, a data bus, and a control bus.

The communication interface 1570 supports wired and wireless Internet communication of the computing device 1500. Additionally, the communication interface 1570 may support various communication methods other than Internet communication. To this end, the communication interface 1570 may be configured to include a communication module well known in the technical field of the present disclosure.

According to some embodiments, the communication interface 1570 may be omitted.

The storage 1590 may non-temporarily store the one or more programs 1591 and various data.

The storage 1590 may include a non-volatile memory such as a Read Only Memory (ROM), an Erasable Programmable ROM (EPROM), an Electrically Erasable Programmable ROM (EEPROM), and a flash memory, a hard disk, a removable disk, or any type of computer-readable recording medium well known in the art to which the present disclosure pertains.

When the computer program 1591 is loaded into the memory 1530, the computer program 1591 may include one or more instructions that cause the processor 1510 to perform methods/operations according to various embodiments of the present disclosure. That is, the processor 1510 can perform methods/operations according to various embodiments of the present disclosure by executing the one or more instructions.

So far, various embodiments of the present disclosure and effects according to the embodiments have been mentioned with reference to FIGS. 1 to 7. The effects according to the technical idea of the present disclosure are not limited to the effects mentioned above, and other effects not mentioned may be clearly understood by those skilled in the art from the description of the specification.

The technical idea of the present disclosure described so far with reference to FIGS. 1 to 7 may be implemented as computer-readable code on a computer-readable medium. The computer-readable recording medium may be, for example, a removable recording medium (CD, DVD, Blu-ray disk, USB storage device, removable hard disk) or a fixed recording medium (ROM, RAM, computer-equipped hard disk). The computer program recorded on the computer-readable recording medium can be transmitted to another computing device through a network such as the Internet and installed on the other computing device, and thus can be used in the other computing device.

In the above, even though all the components constituting the embodiments of the present disclosure have been described as being combined or operated in combination, the technical idea of the present disclosure is not necessarily limited to these embodiments. That is, within the scope of the purpose of the present disclosure, all of the components may operate by selectively combining one or more of them.

Although operations are illustrated in the drawings in a specific order, it should not be understood that the operations must be performed in a specific or sequential order as illustrated or that all of the illustrated operations must be performed to obtain the desired results. In certain situations, multitasking and parallel processing may be advantageous. Moreover, the separation of the various components in the embodiments described above should not be construed as necessarily requiring such separation, and the program components and systems described may generally be integrated together into a single software product or packaged into multiple software products.

Although embodiments of the present disclosure have been described above with reference to the attached drawings, those skilled in the art will understand that the present disclosure can be implemented in other specific forms without changing the technical idea or essential features. Therefore, the embodiments described above should be understood in all respects as illustrative and not restrictive.

The scope of protection of the present disclosure should be interpreted in accordance with the claims below, and all technical ideas within the equivalent scope should be interpreted as being included in the scope of rights of the technical ideas defined by the present disclosure.

What is claimed is:

1. A steering device control device that determines a traveling safety risk factor by determining an outlier in a steering wheel actuator, the steering device control device comprising:
 a processor;
 a network interface;
 a memory; and
 a computer program loaded into the memory and executed by the processor,
 wherein the processor includes
 an instruction for controlling to transmit a steering angle of a driver from the steering wheel actuator to a road wheel actuator,
 an instruction for controlling to transmit a feedback torque from the road wheel actuator to the driver based on a rack force,
 an instruction for checking a system efficiency outlier during control of a steering device, and
 an instruction for transmitting information about a system outlier to a traveling vehicle,
 in which the instruction for checking the system efficiency outlier during the control of the steering device further includes an instruction for detecting overall friction and an instruction for detecting peak friction among the system efficiency outliers.

2. The steering device control device of claim 1, wherein the instruction for detecting the overall friction among the system efficiency outliers further includes an instruction for checking the maximum and minimum friction values according to temperature.

3. The steering device control device of claim 2, wherein the instruction for detecting the overall friction among the system efficiency outliers further includes an instruction to determine whether a disturbance torque is within a range, a torsion bar torque is equal to or less than a certain level, and a traveling vehicle speed is equal to or less than a certain level.

4. The steering device control device of claim 3, wherein the instruction for detecting the overall friction among the system efficiency outliers further includes an instruction of counting the number of determination contents when the disturbance torque is within the range, the torsion bar torque is equal to or less than the certain level, and the traveling vehicle speed is equal to or less than the certain level.

5. The steering device control device of claim 4, wherein the instruction for detecting the overall friction among the system efficiency outliers further includes an instruction for determining whether the number of the determination contents detected is equal to or more than a certain count.

6. The steering device control device of claim 5, wherein the instruction for detecting the overall friction among the system efficiency outliers further includes an instruction for determining the steering wheel actuator friction outlier as normal when the number of the determination contents is not equal to or more than the certain count.

7. The steering device control device of claim 5, wherein the instruction for detecting the overall friction among the system efficiency outliers further includes an instruction for determining the steering wheel actuator friction outlier as normal when the number of times of the determination contents is equal to or more than the certain count.

8. The steering device control device of claim 1, wherein the instruction for detecting the peak friction further includes an instruction for calculating average friction through an FIR filter.

9. The steering device control device of claim 8, wherein the instruction for detecting the peak friction further includes an instruction for determining whether a disturbance torque is higher by a certain level than an average, a torsion bar torque is equal to or less than a certain level, and a traveling vehicle speed is equal to or less than a certain level.

10. The steering device control device of claim 9, wherein the instruction for detecting the peak friction further includes an instruction for storing a location at which the friction occurs when the disturbance torque is higher by the certain level than the average, the torsion bar torque is equal to or less than the certain level, and the traveling vehicle speed is equal to or less than the certain level.

11. The steering device control device of claim 10, wherein the instruction for detecting the peak friction further includes an instruction for determining whether the location at which the friction occurs appears repeatedly at the same location.

12. The steering device control device of claim 11, wherein the instruction for detecting the peak friction further includes an instruction for determining the outlier of the steering wheel actuator friction as normal when the location at which the friction occurs does not appear repeatedly at the same location.

13. The steering device control device of claim 11, wherein the instruction for detecting the peak friction further includes an instruction for determining the outlier of the steering wheel actuator friction as normal when the location at which the friction occurs appears repeatedly at the same location.

14. A method that is performed by a steering device control device and determines a traveling safety risk factor by determining an outlier of a steering wheel actuator, the method comprising:
 controlling to transmit a steering angle of a driver from the steering wheel actuator to a road wheel actuator;
 controlling to transmit a feedback torque from the road wheel actuator to the driver based on a rack force;
 checking a system efficiency outlier during control of a steering device; and
 transmitting information about a system outlier to a traveling vehicle,
 wherein the checking of the system efficiency outlier during the control of the steering device further includes detecting overall friction and detecting peak friction among the system efficiency outliers.

* * * * *